Sept. 17, 1929.   H. S. GANO   1,728,793
THERMAL RELAY
Filed Nov. 14, 1925   3 Sheets-Sheet 1

WITNESSES:
R. J. Butler
G. B. Fjoflat

INVENTOR
Harlan S. Gano.
BY
Wesley G. Caro
ATTORNEY

Sept. 17, 1929.   H. S. GANO   1,728,793
THERMAL RELAY
Filed Nov. 14, 1925   3 Sheets-Sheet 2

WITNESSES:

INVENTOR
Harlan S. Gano.
BY
ATTORNEY

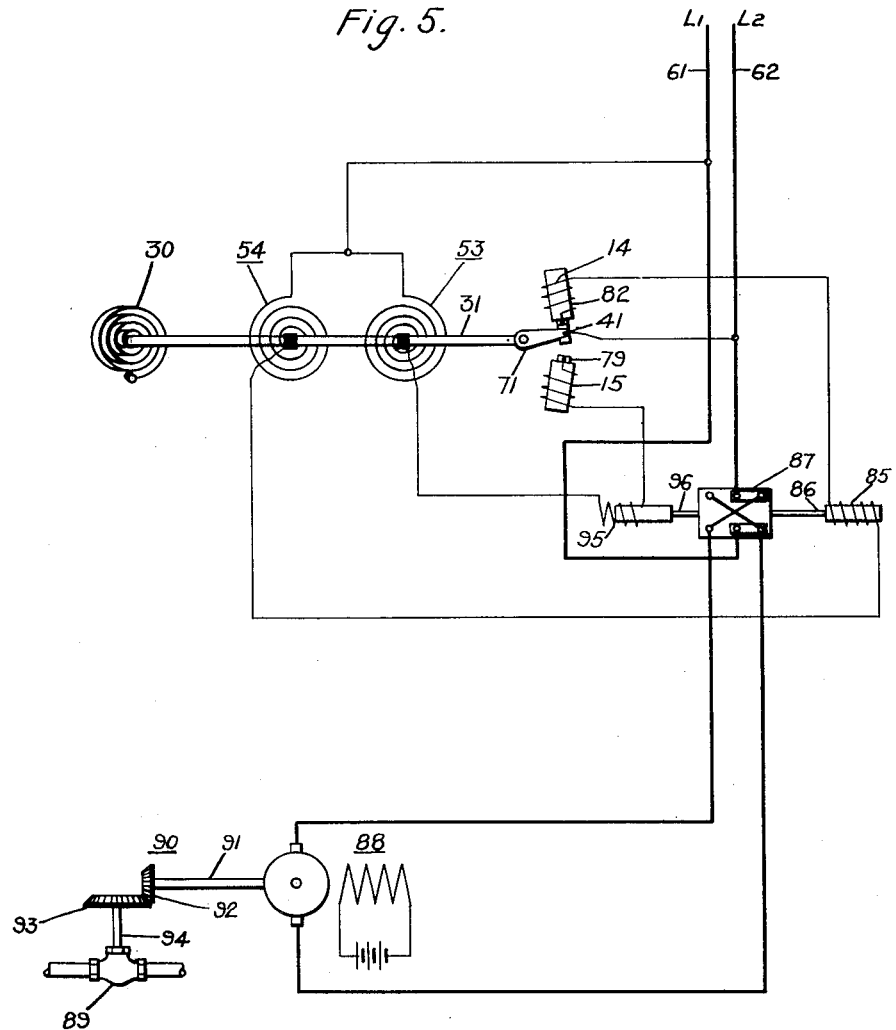

Patented Sept. 17, 1929

1,728,793

UNITED STATES PATENT OFFICE

HARLAN S. GANO, OF PITTSBURGH, PENNSYLVANIA, ASSIGNOR TO WESTINGHOUSE ELECTRIC AND MANUFACTURING COMPANY, A CORPORATION OF PENNSYLVANIA

THERMAL RELAY

Application filed November 14, 1925. Serial No. 69,074.

My invention relates to control systems and particularly to thermal-responsive control devices.

An object of my invention is to provide a thermal-responsive device that shall maintain the temperature of the devices to be controlled substantially constant.

Another object of my invention is to provide a thermal-responsive device that shall have the main thermal element subjected to the temperature of the body to be controlled, and that shall have auxiliary thermal elements responsive to current passing therethrough in order to compensate for the thermal lag in the element subjected to the temperature of the body which is to be controlled.

Another object of my invention is to provide an auxiliary thermal means for a thermal-responsive element that shall cause said thermal-responsive element to be, in effect, more sensitive to the true temperature of the body under control.

In practicing my invention, I provide a main thermal-responsive element of helical form and a plurality of auxiliary bimetallic elements in spiral form, which are mounted on a centrally located shaft. I also provide a pair of electromagnet coils and contact members therefor and connections from the contact members to the auxiliary thermal elements whereby the energization of either of the magnet coils will cause a current to flow through the auxiliary bimetallic elements. I also provide means for attaching one end of the main thermal element to the end of the shaft and for fixing the other end of the main thermal element.

Means are provided for holding fixed the outer ends of the auxiliary elements and the inner ends thereof are secured to the shaft but insulated therefrom. Means are also provided for turning the helical main thermal element in order that the initial torsion applied to the shaft may be varied in accordance with the temperature setting of the device. I also provide a tubular casing for enclosing the main thermal element and a closure means for the auxiliary thermal elements and for joining the casing and the closure means so as to hold them ruggedly in operative relation with each other.

In the accompanying drawings,

Fig. 5 is a schematic diagram of the device embodying my invention as applied to a controlled circuit.

Figure 1:
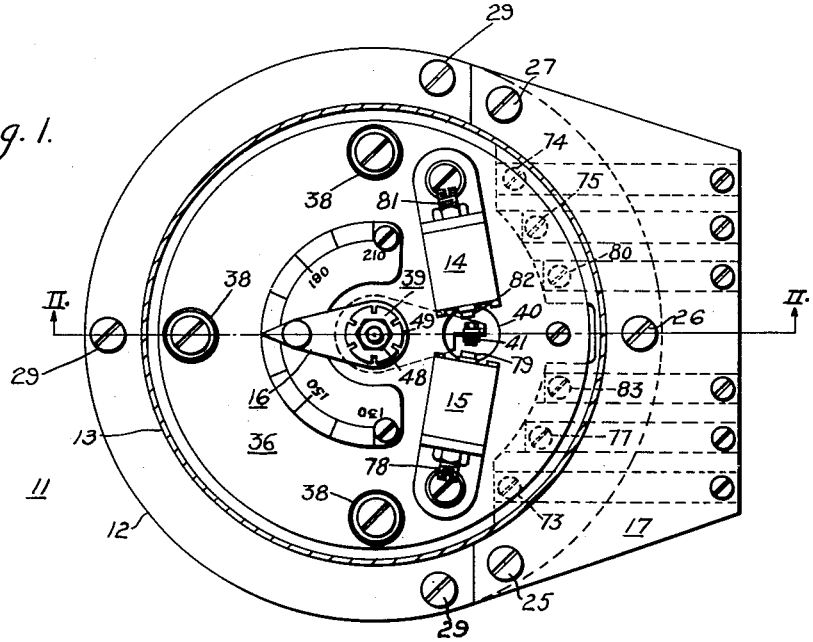
Figure 1 is a top view, partially in section, of the device embodying my invention.

Referring more particularly to Fig. 1, a thermal-responsive device 11 comprises a base 12, a closure member 13, electromagnets 14 and 15, an adjusting means 16 and a terminal carrying member 17.

Figure 2:
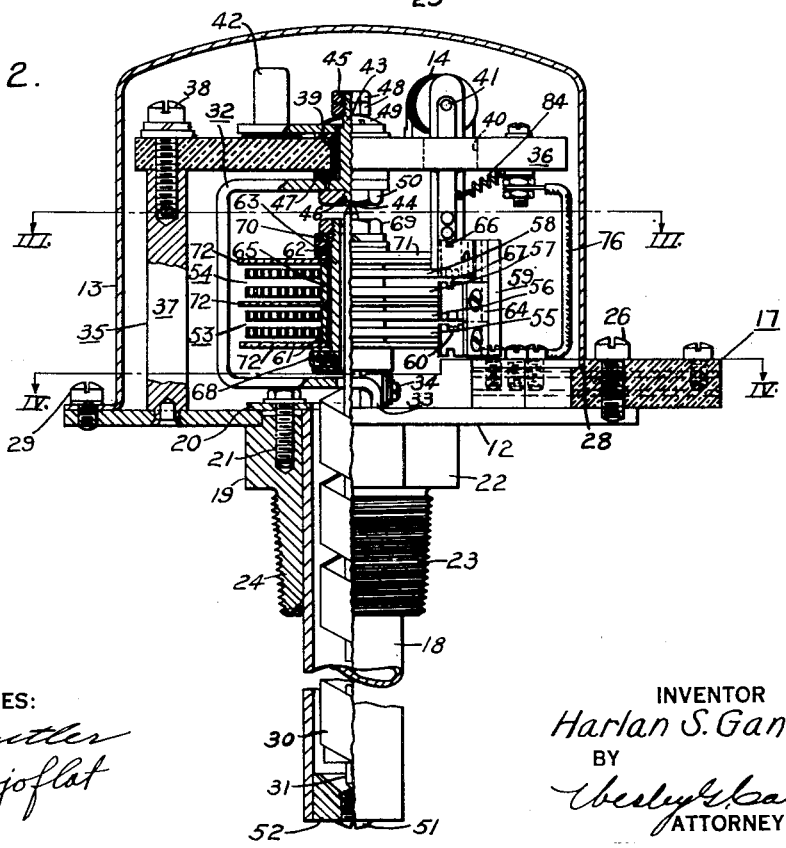
Fig. 2 is a front view, in section taken on the line II—II of Fig. 1.

As shown more clearly in Fig. 2, a tubular casing 18 is attached to the base member 12 by a clamping means 19, washer members 20 and screw members 21.

The clamping member 19 is provided with a nut portion 22 at a tapered threaded portion 23. The member 19 has a cylindrical inner surface 24 that fits tightly against the tubular member 18.

The terminal carrying member 17 is attached to the base member 12 by screw bolts 25, 26 and 27. A segmental recess 28 is provided in the member 17 whereby the cover member 13 is permitted to fit tightly therein. The cover member 13 is fastened to the base member 12 by screw bolts 29.

A main thermally-responsive element 30 is located in the tubular member 18 and is made of a bimetallic strip that is coiled in the form of an elongated helix. The lower end of the helical member 30 is attached to a shaft member 31 at the lower end thereof. The upper end of the helical member 30 is attached to a movable element 32 of U-shape at 33 by means of a screw member 34.

The member 32 is mounted on a supporting frame 35 which comprises a circular insulating member 36 and a plurality of upright members 37. The circular member 36 is attached to the upright members 37 by screw bolts 38.

A pair of openings 39 and 40 are provided in the member 36 for locating the member 32 and whereby a contacting member 41 may be inserted therethrough for engaging contacts on the ends of the cores of the magnets 14 and 15. The member 32 is substantially of U-shape and is attached to an adjusting member 42. The movable, adjusting member 42 comprises a metallic, cylindrical member 43 having a bearing portion 44 at the lower end thereof and threaded portions 45 and 46 at both ends thereof. An insulating bushing 47 is loosely mounted around the metallic member 43, but is pressed into the opening 39 of the member 36. The movable member 42 is held in operative relation with the metallic member 43 by the nuts 48 and the lock washer 49. The member 32 is held in operative relation with the member 43 by a nut member 50.

Bearings 44 and 51 are provided for holding the shaft member 31 in vertical position and centrally located within the helical member 30. The bearing member 51 registers with a closure member 52 located in the bottom of the tubular member 18 and has screw threads thereon whereby the proper bearing pressure at the ends of the shaft may be provided.

Since the member 32 of U-shape may be turned about the axis of the shaft 31 and, since the upper end of the bimetallic member 30 is attached thereto, the member may be subjected to an initial torsional stress, the degree of stress depending upon the temperature to which the member shall be responsive for causing the movable contact 41 to engage either the contact 79 or the contact 82. Thus, by increasing or decreasing the initial torsion applied to the bimetallic member 30, the temperatures at which contact is made between the movable contact member 41 and the stationary contacts 79 and 82 may be controlled.

Auxiliary bimetallic elements 53 and 54 are located within the closure member 13 of the device 11. The element 53 comprises two spirally wound bimetallic coils 55 and 56 and the element 54 comprises a similar pair of bimetallic coils 57 and 58. The element 54 is wound in opposition to the element 53. The outer end of the coil 55 is attached to an insulating member 59a at 60 and the inner end of the coil is attached to a metallic cylinder 61 which is mounted concentrically with the shaft member 31. An insulating bushing 62 is provided for insulating the cylinder 61 from a cylindrical holding member 63 that is also located centrally about the shaft 31. The inner end of the coil 56 is attached to the member 61 and has its outer end 64 attached to the insulating member 59a. The member 59a is carried by a supporting member 59 of substantially L-shape.

Coil members 57 and 58 are mounted in the same manner as coils 55 and 56, but in opposition to the coils 55 and 56. The inner ends of the coils are attached to a metallic cylinder 65 that is insulated from the member 63 by the insulating bushing 62 and the outer ends of the coils 57 and 58 are attached to the insulating member 59a at 66 and 67. The member 63 is secured to the shaft 31 by a set screw 68 and the members mounted around the member 63 are held in operative relation by a nut 69 and a lock washer 70. The contact member 41 is mounted on an arm member 71 that is held in operative relation with the shaft member 31.

The elements 53 and 54 are insulated from each other at their inner ends by an insulating barrier 72 that is disposed between the cylinders 61 and 65 thereby insulating them from each other.

Figure 3:
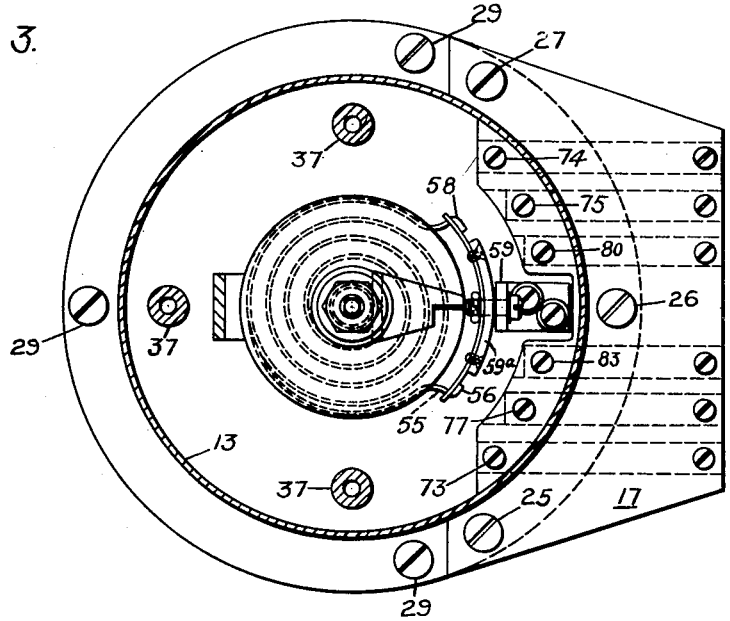
Fig. 3 is a view in section taken along the line III—III of the device illustrated in Fig. 2.
Figure 4:
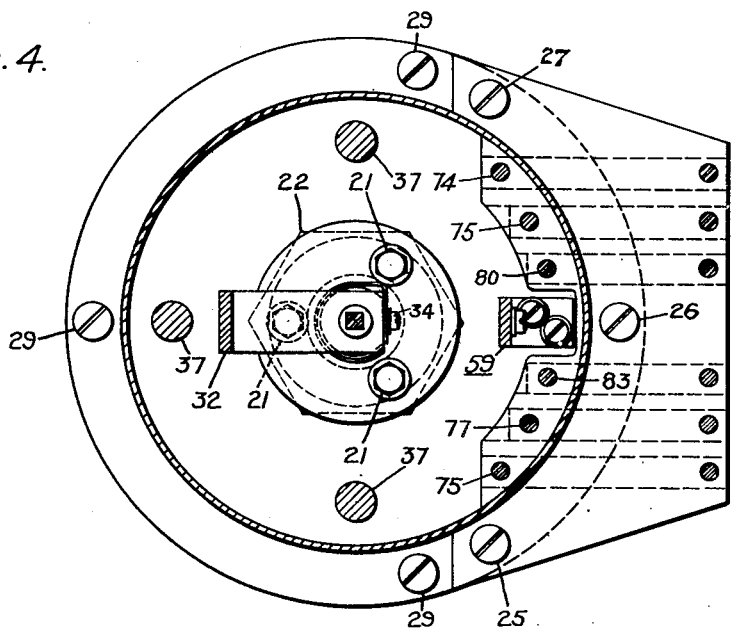
Fig. 4 is a view in section taken along line IV—IV of the device illustrated in Fig. 2.

The electrical connections of the spirally-wound coils 53 and 54 are best shown in Fig. 3 and Fig. 5. The coil 55 is electrically connected to terminal 73 and connection between the inner end of coil 55 and the coil 56 is made by member 61, as illustrated in Fig. 2. The end of coil 56 is connected to terminal member 74. The outer end of coil 57 is connected to terminal 75 and the inner end thereof is connected to coil 58 by the member 65 illustrated in Fig. 2. The outer ends of coils 56 and 58 are connected to terminal 74 by a conductor 76.

The outer end of the electromagnet coil 15 is connected to a terminal 77 through a terminal 78 thereof, and the inner end of the coil of magnet 15 is connected to the contact 79 of its core. The outer end of the coil 14 is connected to a terminal 80 through a terminal 81 thereof and the inner end of the coil of magnet 14 is connected to the contact 82 of its core. The contact member 41 is connected to terminal 83 by a flexible conductor 84.

The device illustrated in Fig. 2 will be described as controlling the temperature of a body of water contained within a storage tank (not shown). The thermally-responsive device 11 is attached by means of the screw threads 23 and the nut portion 22 to the storage tank so that the tubular member 18 extends into the body of water, the temperature of which is to be regulated.

Assuming now that the temperature of the body to be regulated is below the required temperature, and that the contact member 41 is in engagement with the contact of the electromagnet 14, a circuit is then completed from conductor L1 through the bimetallic element 54, coil 85, electromagnet coil 14, and contactor 41 to conductor L2.

When the coil 85 is energized, its movable core member 86 is actuated thereby to close a reversing switch 87, whereby a motor 88 is energized from conductors L1 and L2. The operation of the motor 88 will be effective to open a valve member 89 through transmitting means 90 comprising a shaft member 91, a pair of bevel gears 92 and 93 and a second shaft member 94. As the valve 89 is opened, steam flows into the body of water to increase the temperature thereof. As the current flows through the element 54, the resistance losses therein, cause the temperature of the bimetallic element 54 to rise. The rise in temperature will then cause the element 54 to expand and to exert a torsional force on the shaft 31, which will cause contact member 41 to be disengaged from the contact 82 of the electromagnet 14, whereby the coil 85 is deenergized. The deenergization of the coil 85 will cause the switch 87 to open and to deenergize the motor 88, whereby the valve 89 is prevented from opening further, but steam will continue to flow into the aforesaid body of water to further increase its temperature.

If the temperature of the main thermally-responsive member 30 has not reached a value which will cause the contact members 41 and 82 to remain disengaged then the shaft 31 will turn to again reclose said contact members 41 and 82 and again complete the circuit through the bimetallic element 54 and the coil 85, whereby the valve 89 is opened further. As the temperature of the water gradually penetrates the tubular member 18 and the bimetallic member 30, the member 30 and the element 54 will then have stored up sufficient torsional energy to open the contact members 41 and 82 and deenergize the coil 85, thereby opening the reversing switch 87 to preclude further opening of the valve 89.

If the temperature of the water has risen above a predetermined value, the main thermally responsive member 30 will have expanded sufficiently to effect the engagement of contact members 41 and 79 to thereby energize the element 53 and the coil 95. When the coil 95 is energized, an armature 96 is actuated, whereby the switch 87 is operated to reverse the motor 88, thereby causing valve 89 to close. The operation of the element 53 and the magnet 15 is substantially as described for the operation of the element 54 and the magnet 14.

Various modifications may be made in my device without departing from the spirit and scope thereof. I therefore desire that only such limitations shall be placed thereon as are imposed by the prior art and the appended claims.

I claim as my invention:

1. A thermo-responsive device comprising a casing, two electro-magnets therein, a contact member in operative relation between said electro-magnets, a tubular member attached to said casing, a helically wound bimetallic member disposed therein, a shaft extending into said tubular member and attached to said helical member, a pair of opposed thermo-responsive elements in said casing and operatively connected to said shaft, said opposed thermo-responsive elements being selectively traversed by current in accordance with the engagement of said contacting member with the electromagnets.

2. A thermo-responsive device comprising a shaft, a contact member supported by said shaft, a pair of electromagnets, contact members operatively associated with said shaft-supported contact member, a thermally responsive bimetallic member associated with said shaft for imparting motion thereto and to its contact member in accordance with its temperature, and a pair of opposed double-spiral bimetallic elements selectively traversed by current in accordance with the engagement of said associated contact members for causing disengagement thereof in advance of the temperature at which said bimetallic member is alone operable.

3. In a temperature-responsive device, the combination with a casing having a helically wound bimetallic member and a shaft having a contact-carrying member located therein, said shaft and its contact-carrying member being actuated by said bimetallic member in accordance with the temperature of the latter, of anti-hunting means for said device comprising a pair of opposed double-spiral bimetallic elements attached to said shaft at their inner ends and insulated therefrom and fixedly attached to an insulated terminal member at their outer ends, said spiral elements being selectively traversed by current and operable in accordance therewith for causing said shaft to turn in advance of the temperature at which the helically wound member alone would be effective.

In testimony whereof, I have hereunto subscribed my name this 12th day of November, 1925.

HARLAN S. GANO.